Oct. 29, 1940.        M. KATCHER        2,219,321
THRUST BALL BEARING
Filed Oct. 24, 1939
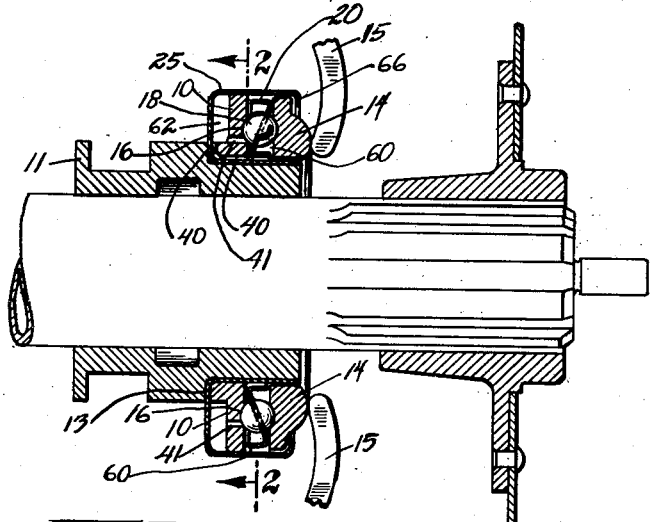
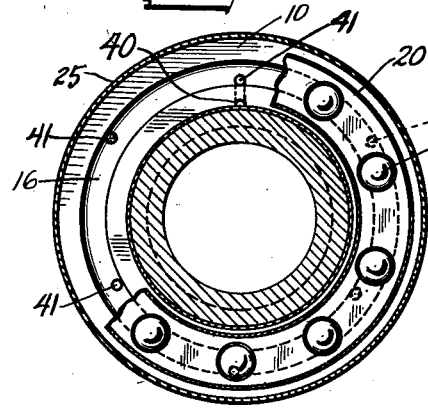
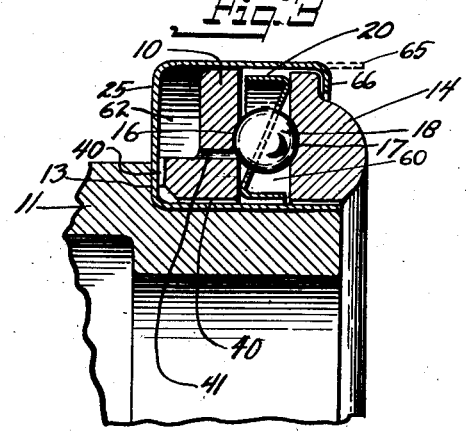
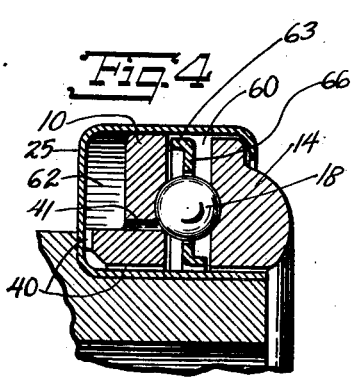
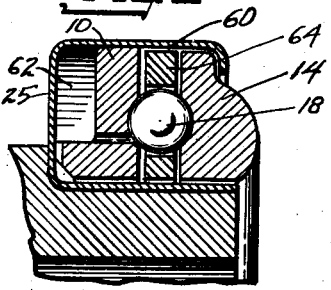
INVENTOR
*Morris Katcher*
BY
*Emanuel Scheyer*
ATTORNEY Patented Oct. 29, 1940

2,219,321

UNITED STATES PATENT OFFICE 2,219,321

THRUST BALL BEARING

Morris Katcher, New York, N. Y.

Application October 24, 1939, Serial No. 300,913

10 Claims. (Cl. 308—233)

This invention relates to ball bearings, and more particularly to those thrust bearings which are used as the clutch release bearing of an automobile. It is desirable in a ball thrust bearing to have efficient lubrication with a minimum escape of the lubricant, both to avoid the necessity of supplying additional lubricant to the bearing and to prevent the likelihood of the lubricant getting on the friction surfaces of the normally dry clutch. With my design, the escape of lubricant is kept to a desired minimum, and by the provision of an additional reservoir over that in the space between the raceways, enough lubricant can be put in the bearing to last for the life of the bearing. As is readily understood, however, provision can be made for a grease fitting to replenish the lubricant if necessary but experience has shown that this is not required. The additional reservoir sends out lubricant into the space between the raceways as the bearing warms up and the lubricant expands, but this lubricant is sucked back to the reservoir to a great extent when the bearing cools.

Other objects and advantages will become apparent upon further study of the description and drawing in which:

Fig. 1 is a vertical longitudinal section of a typical automobile clutch release bearing modified to embody my invention.

Fig. 2 is a cross section taken along the line 2—2 of Fig. 1.

Fig. 3 is a partial longitudinal section through the bearing to an enlarged scale showing my preferred form of ball retainer ring.

Fig. 4 is a section taken similarly to Fig. 3 and shows a modified form of ball retainer ring, and Fig. 5 is a section taken similarly to Fig. 3 and shows another modified form of ball retainer ring.

The fixed race ring 10 has a drive fit, both at its outside diameter and its inside diameter, in the spun sheet metal jacket or shell 25. Next, Z-shaped retainer ring 20, with balls 18 in spaced openings in its web, is set inside shell 25. And alongside retainer ring 20 with balls 18 in shell 25 is mounted free race ring 14. Before insertion of free race ring 14 into shell 25, the outer edge of said shell projected out straight as shown by the dotted lines at 65 in Fig. 3. After said latter ring is inserted, said edge is spun so as to extend radially toward the axis of the bearing forming a flange 66.

Retainer ring 20 with its balls 18 is free to rotate in the space 60 between race rings 10 and 14, the conventional ball race grooves 16 and 17 respectively being provided in the race rings. Race ring 14 has a running fit in shell 25. Fixed race ring 10 is substantially L-shaped in cross section so as to provide a reservoir 62 between the radially extending leg of the ring and the shell 25. In addition to packing space 60 with grease, reservoir 62 is also packed, giving additional storage capacity for grease, and as will be seen, a place from which the grease is sent out when the bearing is heated and to which it returns when the bearing cools.

An air vent 40 is provided between reservoir 62 and space 60 leading along the internal face of fixed race ring 10 and thence at right angles along its rear face. Very small passages 41 lead from reservoir 62 to ball groove 16. The location of air vent 40 in race ring 10 at its internal face assists in making it function as an air vent. As the bearing rotates centrifugal action tends to force the grease radially outward, so that a passage located sufficiently inward radially will tend to be free from grease.

Shell 25 with its rings and balls assembled therein is given a drive or tight fit on floating or sliding hub 11, said shell abutting a shoulder 13 on the hub. The sliding hub, it will be understood, is reciprocated by the conventional clutch pedal. The forward face of the free race ring 14 is contacted by a plurality of radially arranged clutch release levers or fingers 15.

It is believed the action is as follows: As the bearing warms up, the grease expands and the surplus in reservoir 62 squeezes through passages 41 into space 60. Upon cooling, the grease contracts and air is sucked in from the outside through the air vent 40. The next time the bearing goes into action and its temperature is raised, the air bubbles previously sucked in expand and force a certain amount of grease into the race. This action continues with the alternate heating and cooling of the bearing. Provision could be made for a grease fitting to replenish the lubricant as it gives out. Experience, however, has shown that this is unnecessary. With the proper proportioning of reservoir 62 and its passages, the lubricant will last during the life of the bearing.

In my preferred form, retainer ring 20 has a Z-shaped cross section. The passages 41 lead in the grease opposite the web of ring 20. The purpose of this is to retain as much of the lubricant as possible from being thrown by centrifugal action into the running clearance between race ring 14 and its outside diameter and shell 25.

In Fig. 4, a modified form of retainer ring is shown. Here ring 63 has its web 66 substantially vertical, said web not extending over to rings 10 and 14 as in Fig. 3.

In Fig. 5, still another form of retainer ring is shown. Ring 64 is substantially rectangular in cross section. The storage capacity of space 60 for grease is considerably less than in Figs. 3 and 4.

I claim:

1. A thrust ball bearing comprising an annular shell having outer and inner walls and a rear wall, the internal diameter of the shell being of suitable dimension for a drive fit of the shell on a predetermined hub, a fixed race ring at the rear of the shell having a tight fit at its outer and inner diameters with the inside faces respectively of the outer and inner walls, said ring being formed to leave a space between its rear face and the forward face of the rear wall for providing a grease reservoir, a free race ring loosely mounted at the forward portion of the shell, a retaining ring loosely mounted in the shell between the race rings, and balls extending between the race rings holding them in spaced relation, said balls themselves being held in spaced relation by the retaining ring, the fixed race ring being provided with at least one passage leading from the reservoir to the space between the race rings, a vent also being provided leading from the reservoir past the fixed race ring to the space between the race rings at the inside face of the inner wall.

2. A thrust ball bearing comprising an annular shell having an axially extending outer wall and a rear wall, a fixed race ring at the rear portion of the shell having a tight fit in the shell, a space for a grease reservoir being provided to the rear of the front face of said ring, a free race ring loosely mounted and retained at the front portion of the shell, a retaining ring loosely mounted in the shell between the race rings, and balls extending between the race rings, holding them in spaced relation, said balls themselves being held in spaced relation by the retaining ring, at least one passage being provided between the reservoir and the space between the race rings.

3. A thrust ball bearing comprising an annular shell having an axially extending outer wall and a rear wall, a fixed race ring at the rear portion of the shell fixed to the shell, a space for a grease reservoir being provided to the rear of the front face of said ring, a free race ring loosely mounted at the front portion of the shell, a retaining ring loosely mounted in the shell between the race rings, and balls extending between the race rings holding them in spaced relation and riding in grooves provided in the latter rings, said balls themselves being held in spaced relation by the retaining ring, at least one passage being provided in the fixed race ring leading from the reservoir to the groove in the fixed race ring.

4. A thrust ball bearing comprising an annular shell having an axially extending outer wall and a rear wall, a fixed race ring at the rear portion of the shell fixed to the shell, a space for a grease reservoir being provided to the rear of the front face of said ring, a free race ring loosely mounted in the front portion of the shell, a retaining ring loosely mounted in the shell between the race rings, and balls extending between the race rings holding them in spaced relation, said balls themselves being held in spaced relation by the retaining ring, at least two passages being provided between the reservoir and the space between the race rings, one of said passages being located sufficiently inwardly radially from the outer periphery of the bearing to function as an air vent for the reservoir, the other of the passages being located radially outwardly from the air vent for carrying grease between the reservoir and the space between the race rings.

5. A thrust bearing as claimed in claim 4 in which the passage functioning as an air vent is located in the fixed race ring substantially at its inner diameter.

6. A thrust ball bearing comprising an annular shell having outer and inner walls and a rear wall, a fixed race ring at the rear portion of the shell having a tight fit in the shell, a space for a grease reservoir being provided between said ring and the rear wall of the shell, a free race ring loosely mounted and retained at the front portion of the shell, a retaining ring loosely mounted in the shell between the race rings, and balls extending between the race rings holding them in spaced relation, said balls themselves being held in spaced relation by the retaining ring, at least one passage being provided between the reservoir and the space between the race rings.

7. A thrust ball bearing comprising an annular shell having outer and inner walls and a rear wall, a fixed race ring at the rear portion of the shell having a tight fit in the shell, a space for a grease reservoir being provided to the rear of the front face of said ring, a free race ring loosely mounted and retained at the front portion of the shell, a retaining ring loosely mounted in the shell between the race rings, and balls extending between the race rings, holding them in spaced relation, said balls themselves being held in spaced relation by the retaining ring, a plurality of passages being provided between the reservoir and the space between the race rings, at least one of said passages serving as an air vent and being formed by providing an axially extending groove in the internal face of the fixed race ring opposite the face inside of the shell of the inner wall.

8. A thrust bearing comprising an annular shell having an axially extending outer wall and a rear wall, a fixed race ring at the rear portion of the shell having a tight fit in the shell, the cross section of the band of said ring being substantially L-shaped with the upstanding leg of the L extending radially outward from its base, the latter extending axially from the leg to the rear of the shell, providing a space for a grease reservoir between the rear wall of the shell and said upstanding leg said space extending radially outward from said base, a free race ring loosely mounted and retained at the front portion of the shell, a retaining ring loosely mounted in the shell between the race rings, and balls extending between the race rings holding them in spaced relation, said balls themselves being held in spaced relation by the retaining ring, at least one passage being provided through said leg between the reservoir and the space between the race rings, and at least one additional passage being provided extending through the base from the reservoir at the rear to the space between the race rings at the front, the front end of said latter passage emerging substantially at the radially inward face of the base.

9. A thrust ball bearing as claimed in claim 2, in which the cross section of the band of the retaining ring is substantially Z-shaped having axially extending flanges and a web extending from the rear of the radially inward flange to the front of the radially outward flange, the passage emerging in the space between the race rings opposite an intermediate portion of the web.

10. A thrust ball bearing, as claimed in claim 2, in which the cross section of the band of the retaining ring is substantially Z-shaped having flanges extending substantially entirely across the space between the race rings, the radially outward flange being substantially adjacent the inner face of the outer wall of the shell.

MORRIS KATCHER.